US012401176B2

(12) United States Patent
MacDonald et al.

(10) Patent No.: US 12,401,176 B2
(45) Date of Patent: Aug. 26, 2025

(54) HYBRID INSTALLATION APPARATUS AND PROCESSES

(71) Applicant: Sherman + Reilly, Inc., Chattanooga, TN (US)

(72) Inventors: Douglas Bruce MacDonald, Dawsonville, GA (US); Toni Corinne Tran, Chattanooga, TN (US); Carlos Albert Bellot, Chattanooga, TN (US); Timothy Michael Hanson, Chattanooga, TN (US); John Jeremiah Morton, Chattanooga, TN (US)

(73) Assignee: Sherman + Reilly, Inc., Chattanooga, TN (US)

( * ) Notice: Subject to any disclaimer, the term of this patent is extended or adjusted under 35 U.S.C. 154(b) by 414 days.

(21) Appl. No.: 17/798,715

(22) PCT Filed: Feb. 11, 2021

(86) PCT No.: PCT/US2021/017738
§ 371 (c)(1),
(2) Date: Aug. 10, 2022

(87) PCT Pub. No.: WO2021/163396
PCT Pub. Date: Aug. 19, 2021

(65) Prior Publication Data
US 2023/0132039 A1 Apr. 27, 2023

Related U.S. Application Data

(60) Provisional application No. 62/972,800, filed on Feb. 11, 2020.

(51) Int. Cl.
*H02G 1/02* (2006.01)
*B66D 1/12* (2006.01)
(Continued)

(52) U.S. Cl.
CPC .............. *H02G 1/04* (2013.01); *B66D 1/12* (2013.01); *B66D 1/14* (2013.01)

(58) Field of Classification Search
CPC .. H02G 1/04; H02G 1/00; B66F 19/00; B66F 2700/00; B66D 1/00
See application file for complete search history.

(56) References Cited

U.S. PATENT DOCUMENTS 3,319,935 A   5/1967  Eitel et al.
5,826,860 A * 10/1998 Theurer .................. B60M 1/28
                                                        242/397.3

(Continued)

FOREIGN PATENT DOCUMENTS

CN        109667814 A      4/2019
WO        2019148068 A1    8/2019
WO     WO-2021163390 A1 *  8/2021   ............... H02G 1/04

OTHER PUBLICATIONS

Extended European Search Report in related EP Application No. 21754099.6 mailed Feb. 9, 2024.
(Continued)

*Primary Examiner* — Lee D Wilson
(74) *Attorney, Agent, or Firm* — TROUTMAN PEPPER LOCKE LLP; Ryan Schneider; Korbin M. Blunck (57) ABSTRACT

A hybrid conductor puller-tensioner and control system are disclosed. The puller-tensioner includes a motor/generator mechanically coupled to a drum. The motor/generator is in electrical communication with a generator and a rechargeable power source. In a tensioning mode, the motor/generator can be used to charge the rechargeable power source. In a pulling mode, when the power demanded by the motor exceeds the capacity of the generator, the motor can be connected to both the generator and the rechargeable power source simultaneously to provide additional power.

9 Claims, 5 Drawing Sheets

(51) Int. Cl.
  *B66D 1/14*    (2006.01)
  *H02G 1/04*    (2006.01)

(56) References Cited

U.S. PATENT DOCUMENTS

| | | | |
|---|---|---|---|
| 12,244,131 B2 * | 3/2025 | Jackson | H02G 1/04 |
| 2009/0267037 A1 | 10/2009 | Johnson et al. | |
| 2018/0313882 A1 | 11/2018 | McNulty et al. | |
| 2023/0132039 A1 * | 4/2023 | MacDonald | H02G 1/04 |
| | | | 254/134.3 R |
| 2023/0187914 A1 * | 6/2023 | Muehlhans | H02G 1/08 |
| | | | 254/134.3 R |
| 2024/0063615 A1 * | 2/2024 | Post | H02G 1/081 |

OTHER PUBLICATIONS

International Preliminary Report on Patentability in related PCT Application No. PCT/US2021/017738, mailed Aug. 11, 2022.
International Search Report and Written Opinion in priority PCT Application No. PCT/US2021/017738, mailed Apr. 22, 2021.

* cited by examiner

HYBRID INSTALLATION APPARATUS AND PROCESSES

CROSS-REFERENCE TO RELATED APPLICATIONS

This application is a § 371 national stage of International Application PCT/US2021/017738, with an international filing date of 11 Feb. 2021, which claims the benefit of U.S. Provisional Patent Application No. 62/972,800 filed 11 Feb. 2020, the benefit of the earlier filing date of which is hereby claimed under 35 USC § 119 (e). The entire contents and substance of all applications are hereby incorporated by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Invention

The invention is in the field of cable stringing apparatuses and processes, and, more particularly, to hybrid systems and methods.

2. Description of Related Art

High voltage utility transmission lines can transmit power over hundreds of miles with minimal losses because of the very high voltages used. Step-up transformers located at utility power generation plants increase the voltage transmission levels which minimizes losses due to the resistance of the transmission line (i.e., the conductor). As electrical demand continues to grow, higher-capacity lines and/or additional lines are needed.

Equipment and tools for overhead and underground power line installation and maintenance include pullers, tensioners, bundle blocks, reel trailers, and battery tools.

Exemplary equipment includes, among others, Sherman+Reilly's PT-3000 Puller Tensioner combining a puller, tensioner, and reconductorer in single unit for overhead or underground applications. It has dual overhead and underground hydraulic levelwind, a direct drive hydrostatic motor, and a mechanical spline engagement system. It is capable of pulling 3,000 lbs. and tensioning 2,000 lbs.

The PTX-3500 Puller Tensioner has a fully hydraulic direct drive system, and is capable of pulling up to 3,500 lbs. with additional re-conductoring capabilities, and tensioning up to 2,000 lbs. Hydraulic motor optimization allows for low force pull off at higher speeds, and hydraulic levelwind incorporates two cylinders that allow the levelwind to move smoothly and efficiently.

The P-1400X Puller is a puller and reconductorer in one unit with a pulling capacity of 14,000 lbs.

The Sherman+Reilly BWHT 1485 Tensioner is completely hydraulic, equipped with either gas or diesel power. In a tensioning mode, they maintain a positive controlled pressure during the tensioning operation. The unit will also operate in either direction and may be used for either reeving, paying out or pulling back on the conductor. The system is equipped with a spring applied emergency brake which will automatically apply if hydraulic pressure is lost for any reason. Brakes may be applied manually when desired to park the system. The direction control lever is used to select either the Pay Out (reeve), Tension (neutral) or Pull Back mode. The line tension control is used to regulate the conductor tension during stringing. The hydraulic pressure gauge is used to display the hydraulic system pressure during operation.

Stringing high-voltage conductor lines across significant distances requires the use of conductor stringing apparatuses. The installation of power transmission lines, sometimes referred to as "pulling conductors", or "tension stringing" utilizes a number of components spread over a wide area. A device called a conductor or cable puller-tensioner is used, although those of skill in the art know that other terms are used for this equipment. The equipment is typically termed by what it does.

The stringing equipment typically work in pairs: a puller for pulling a cable element (conductors, fiber optic cables, and the like) through stringing sheaves of utility structures, like poles and towers, and a tensioner providing resistance to the cable. The paired equipment can be designed for only its purpose—a puller that only performs pulling and a tensioner that only provides tension, or one of both of the pair of equipment can be a unit capable of performing both as a puller and a tensioner, and during any stringing operation performing its specific set of tasks depending on which side of the stringing operation they are located.

For simplicity, as used herein the term "puller-tensioner" includes units that only function as a puller, units that only function as a tensioner, and units that can function as both a puller and a tensioner. When appropriate for context, the term "puller" and/or "tensioner" is also used.

The installation of power transmission lines, sometimes referred to as "pulling conductors", or "tension stringing" utilizes a number of components spread over a wide area. The conductor is pulled into position under tension. As discussed, stringing equipment typically work in pairs: a puller-tensioner for pulling the conductor through stringing sheaves of utility structures, like poles and towers, and a puller-tensioner providing resistance to the conductor (and the pulling operation) until installation of the conductor is complete.

A puller is set up at one end of the line section to perform the pulling operation, and a tensioner to perform the tensioning operation at the other end. Typically, a reel of conductor is staged behind the tensioner. A pulling line is strung from the puller, through stringing blocks between the puller and tensioner. The end of the pulling line is then attached to the conductor end after it has been threaded through the tensioner.

During the stringing process, the conductor is pulled through the stringing sheaves until the end reaches the puller. The tension maintained between the tensioner and the puller keeps the conductor clear of the ground and other obstructions that could cause damage.

A puller-tensioner is provided with one or more drive lines (for example, depending on the machine, drums, spools, bull wheels, screwing systems, other pulling systems, pulling system and the like), a drive line for each cable to be strung. The drive line of the puller is equipped with power for pulling with a force greater than the braking action of the tensioner at the other end of the line. The "pulling" can be via rotation of a drum, or via alternating action for piling the conductor, or a hand-over-hand pull, or other actions that pull the conductor.

There are scenarios with the "pulling" action can be a "pushing action," and the pushed element (cable/conductor) a pulled element (like optical ground wire).

The length of the conductor being pulled/installed can be over a mile long. A running board can also be attached to the conductors, which can in turn be attached to the pulling line that pulls the running board and conductors through the stringing sheaves of the utility structures.

Conventional pullers and tensioners are powered by internal combustion engines driving a hydraulic system that with appropriate gearing rotates the drive line at the specified torque and speed to pull the pulling line/conductor. Tensioning is performed by controlling the hydraulic pressure within the tensioner's system and/or via mechanical brakes, resisting the rotation of the tensioner's drive line (being for example a drum) and creating the desired tension in the conductor line.

Reliance only on internal combustion engines for power supporting puller-tensioners present a number of drawbacks. Internal combustion engines are noisy and thus disadvantageous when used in areas that govern limited noise pollution. Internal combustion engines are relatively heavy polluters and thus disadvantageous to good environmental stewardship. Additionally, the drive output of an internal combustion engine is tied to the combustion engine's torque curve, which can be disadvantageous when used with pullers and tensioners.

It is, therefore, desirable to augment power supplied conventionally only by internal combustion engines/generators if not remove completely the dependence upon internal combustion engines in pushing and/or pulling operations. To the extent it remains beneficial to have pushing and/or pulling equipment supplied with both an engine and electric power in appropriate situations, it is an object of the present invention to combine both engine technologies with electric technologies to provide a hybrid puller-tensioner and processes regarding same. Aspects of the present disclosure address these and other issues.

BRIEF SUMMARY OF THE INVENTION

In accordance with an exemplary embodiment of the present invention, a puller-tensioner comprises an engine, (for example, thermal engines, internal combustion engines, external combustion engines, reaction engines, fuel cells and the like), a generator to convert power from the engine into electric power, a rechargeable power source, a drive line, and a motor/generator, coupled to the drive line, and in electrical communication with the generator and the rechargeable power source, the motor/generator driving the drive line in a pulling mode, and resisting the driving of the drive line in a tensioning mode, wherein, in the pulling mode, the motor/generator is configured to receive power from the rechargeable power source and/or from the generator, and wherein, in the tensioning mode, the rechargeable power source is configured to receive power from the motor/generator.

Thus, an exemplary puller-tensioner is a hybrid, having two (or more) different sources of power, for example a battery/capacitor bank and a generator/engine system. Both sources are preferably configured to operate the pushing and/or pulling operation solely, at least for a period of time, should one source of power not be available.

For example, in a first situation, a puller-tensioner may be in a low noise environment and/or a clean air environment, where running an engine like an internal combustion engine is disfavored if not banned. Thus, the battery/capacitor bank may need sufficient capacity to operate the pushing and/or pulling operation solely, at least until the puller-tensioner is redeployed in an area where the internal combustion engine can be used. Or, the battery/capacitor bank should be capable of recharging, including from the motor during tensioning or from other sources, in order to maintain a capacity to operate the pushing and/or pulling operation.

Of course, to be successful in this first situation, the battery/capacitor bank must be able to handle the pushing and/or pulling operation (managing the drive line) on its own, and thus the puller-tensioner must be in an area where the battery/capacitor bank can be recharged solely by on-board recharging, but without running an internal combustion engine, and/or recharged solely by an external power supply (in range of power from the grid for example), or a combination of both on-board recharging and external recharging.

In a second situation, the puller-tensioner may be in a low noise environment and/or a clean air environment, where running an internal combustion engine is disfavored but not banned. Thus, the battery/capacitor bank is the preferred source to operate the pushing and/or pulling operation, and the internal combustion engine/generator a less preferred source.

To be successful in this second situation, when the battery/capacitor bank is not enough/no longer enough to handle the pushing and/or pulling operation, the generator is used to power the motor to handle the pushing and/or pulling operation and/or as a resource for recharging the battery/capacitor bank. The engine can also be directly communitive with the drive line, and thus complete the pushing and/or pulling operation in this way.

In a third situation, the puller-tensioner may be in an environment where running a, internal combustion engine is useful and allowed. Thus, both the battery/capacitor bank and the internal combustion engine/generator are managed to optimize use of fuel/stored electricity with primary concerns related to beneficial pricing of running one power source and another power source in beneficial ways and/or related to beneficial power needs of a particular pushing and/or pulling operation while running one power source and another power source in beneficial ways.

Under any of the above approaches, battery/capacitor banks have their own disadvantages. Batteries/capacitor banks are limited in the amount of energy they can provide. In addition, because cables are often strung in remote locations, it may be difficult to locate a suitable rechargeable source to recharge batteries/capacitor banks. As a result, an all/only electric puller-tensioner might be useful only for short-durations or where batteries are very large to provide sufficient capacity.

In the pulling mode, the motor/generator can be configured to receive power from only the rechargeable power source.

The puller-tensioner can further comprise a kinetic energy store to convert electrical energy from the motor/generator to mechanical energy during a tensioning operation.

The puller-tensioner can further comprise an external power connection to provide power to the motor/generator.

The puller-tensioner can further comprise a resistor bank to dissipate electric energy received from the motor/generator during a tensioning operation.

In accordance with another exemplary embodiment of the present invention, an innovative user interface and intelligent control can be provided to both provide an operator with real-time information on the various systems on the puller-tensioner and whether any one or more power sources will be sufficient to complete the stringing operation, warn the operator if conditions warrant a warning, and control/throttle the driving and the resisting of the drive line to lengthen the amount of time current sources can continue the stringing operation and/or automatically pull power from alternative sources to be sure a pull can be completed.

For example, the present invention can include a method of providing an operator with information related to the control of a drive line of a puller-tensioner during a stringing operation comprising driving the drive line in a pulling mode of the stringing operation by a motor during a pulling period, wherein the motor is powered by a first source of power, resisting the drive line in a tensioning mode of the stringing operation by the motor during a tensioning period, monitoring the driving and resisting to determine if the capacity of the battery/capacitor bank can complete the stringing operation, and providing an operator with data sufficient to manage the driving and resisting, and the provision of any additional power needs to complete the stringing operation.

The data can be displayed for the operator.

The method can further comprise alerting the operator if the capacity of the battery/capacitor bank cannot complete the stringing operation.

In accordance with another exemplary embodiment of the present invention, the present invention can intelligently control a puller among a parallel configuration, a series configuration, and/or a series-parallel configuration with regarding to hybrid power sourcing.

A method of operating a drive line of a puller during a stringing operation can comprise driving the drive line in a pulling mode of the stringing operation during a pulling period, and selectively driving the drive line in the pulling mode among at least a parallel configuration, a series configuration, and/or a series-parallel configuration, wherein in the parallel configuration, a motor located on the puller-tensioner and an engine located on the puller-tensioner can both individually drive the drive line or both can jointly drive the drive line, the motor having a first source of power comprising a battery/capacitor bank, wherein in the series configuration, the motor individually drives the drive line, the motor having the first source of power and a second source of power, the first source of power comprising the battery/capacitor bank and the second source of power comprising a generator powered by the engine, and wherein in the series-parallel configuration the motor and engine can both individually drive the drive line or both can jointly drive the drive line, and the motor has the first source of power and the second source of power, the first source of power comprising the battery/capacitor bank and the second source of power comprising the generator powered by the engine.

In accordance with another exemplary embodiment of the present invention, a method of operating a drive line of a puller during a stringing operation comprises driving the drive line in a pulling mode of the stringing operation by a motor during a pulling period, and powering the motor by a first source of power located on the puller, wherein the first source of power comprises a battery/capacitor bank.

During the pulling period, the powering can be solely by the first source of power.

The method can further comprise recharging the first source of power.

The method can further comprise powering the motor by a second source of power located on the puller different than the first source.

Recharging the first source of power can comprises recharging with a second source of power located on the puller different than the first source, wherein the second source of power comprises a generator in electrical communication with the first source of power, and wherein the generator converts power from an engine into power.

Recharging the first source of power can comprises recharging with a power source not located on the puller.

Recharging the first source of power can comprises recharging with a kinetic store.

During a first portion of the pulling period, the powering can be solely by the first source of power, and wherein during a second portion of the pulling period different than the first portion, the powering is solely by the second source of power.

During at least a portion of the pulling period, the powering can be concurrently by the first source of power and by the second source of power.

The second source of power can comprise a generator in electrical communication with the first source of power, and wherein the generator converts power from an engine into power.

In accordance with another exemplary embodiment of the present invention, a method of operating a drive line of a puller-tensioner during a stringing operation comprises driving the drive line in a pulling mode of the stringing operation by a motor during a pulling period, resisting the drive line in a tensioning mode of the stringing operation by the motor during a tensioning period, and powering the motor by a first source of power located on the puller, wherein the first source of power comprises a battery/capacitor bank.

The puller-tensioner is selected from the group consisting of overhead pullers, overhead tensioners, bull wheel pullers, bull wheel tensioners, overhead puller-tensioners, underground pullers, v-groove pullers, v-groove puller-tensioner, and pilot line winders.

During the pulling period, the powering can be solely by the first source of power.

The method can further comprise recharging the first source of power.

The method can further comprise powering the motor by a second source of power located on the puller different than the first source.

Recharging the first source of power can comprise recharging with a second source of power located on the puller different than the first source, wherein the second source of power comprises a generator in electrical communication with the first source of power, and wherein the generator converts power from an engine into power.

Recharging the first source of power can comprise recharging with a power source not located on the puller.

Recharging the first source of power can comprise recharging with a kinetic store.

During a first portion of the pulling period, the powering can be solely by the first source of power, and wherein during a second portion of the pulling period different than the first portion, the powering can be solely by the second source of power.

During at least a portion of the pulling period, the powering can be concurrently by the first source of power and by the second source of power.

The second source of power can comprise a generator in electrical communication with the first source of power, and wherein the generator converts power from an engine into power.

In accordance with another exemplary embodiment of the present invention, a method of operating a drive line of a puller-tensioner during a stringing operation comprises driving the drive line in a pulling mode of the stringing operation during a pulling period, resisting the drive line in a tensioning mode of the stringing operation during a tensioning period, and selectively driving the drive line in the pulling mode among at least a parallel configuration, a series configuration, and/or a series-parallel configuration, wherein in the parallel configuration, a motor located on the puller-tensioner and an engine located on the puller-tensioner can both individually drive the drive line or both can jointly drive the drive line, the motor having a first source of power comprising a battery/capacitor bank, wherein in the series configuration, the motor individually drives the drive line, the motor having the first source of power and a second source of power, the first source of power comprising the battery/capacitor bank and the second source of power comprising a generator powered by the engine, and wherein in the series-parallel configuration the motor and engine can both individually drive the drive line or both can jointly drive the drive line, and the motor has the first source of power and the second source of power, the first source of power comprising the battery/capacitor bank and the second source of power comprising the generator powered by the engine.

In accordance with another exemplary embodiment of the present invention, a method of controlling a drive line of a puller-tensioner during a stringing operation comprises driving the drive line in a pulling mode of the stringing operation by a motor during a pulling period, wherein the motor is powered by a first source of power, resisting the drive line in a tensioning mode of the stringing operation by the motor during a tensioning period, and intelligently controlling the driving and resisting, wherein the first source of power comprises a battery/capacitor bank, wherein at least a portion of energy produced during the resisting is stored in the battery/capacitor bank, and wherein intelligently controlling comprises determining an amount of the stringing operation completed, determining an amount of the stringing operation left to be completed, monitoring a current capacity of the first power source, determining if the current capacity of the first power source and the added capacity from one or more tensioning periods in the amount of the stringing operation left to be completed is sufficient to power the motor during one or more pulling periods in the amount of the stringing operation left to be completed, changing one or more driving characteristics and resisting characteristics to extend the use of the first source of power to complete as much of the stringing operation before battery/capacitor bank exhaustion.

Intelligently controlling can further comprise providing sufficient power to the drive line from a second source of power different than the first if the battery/capacitor bank will exhaust prior to completion of the stringing operation, and completing the stringing operation with the second source of power and/or augmenting the use of the battery/capacitor bank with the second source of power to complete the stringing operation.

Intelligently controlling can further comprise providing sufficient additional power to the battery/capacitor bank so the battery/capacitor bank will not exhaust prior to completion of the stringing operation.

The providing can be from a generator powered by an engine.

The providing can from an external source of power.

In accordance with another exemplary embodiment of the present invention, a puller comprises an engine, a generator to convert power from the engine into electric power, a rechargeable power source, a drive line, and a motor/generator, coupled to the drive line, and in electrical communication with the generator and the rechargeable power source, the motor/generator driving the drive line in a pulling mode.

The engine can be coupled to the drive line.

In the pulling mode, the motor/generator can be configured to receive power from only the rechargeable power source.

In the pulling mode, the motor/generator can be configured to receive power from the rechargeable power source and from the generator.

The rechargeable power source can be configured to receive power from the motor/generator.

The rechargeable power source can be configured to receive power from the generator.

The rechargeable power source can be configured to receive power from the motor/generator and the generator.

In accordance with another exemplary embodiment of the present invention, a puller comprises an engine, a generator to convert power from the engine into electric power, a rechargeable power source, a drive line, and a motor/generator, coupled to the drive line, and in electrical communication with the generator and the rechargeable power source, the motor/generator driving the drive line in a pulling mode, wherein the engine is coupled to the drive line, wherein, in the pulling mode, the motor/generator is configured to receive power from the rechargeable power source and from the generator.

The rechargeable power source can be configured to receive power from the motor/generator and from the generator.

In accordance with another exemplary embodiment of the present invention, a method of operating of a puller-tensioner comprising an engine, a generator, a motor/generator, a rechargeable energy store, and a drum, comprises operating the engine to cause the generator to generate power, driving the motor/generator with the power to control the driving of the drum, determining that an power demand for a current operation of the motor/generator exceeds a maximum output of the generator, stopping the motor/generator, sending the power from the generator to the rechargeable energy store to charge the rechargeable energy store, determining that the rechargeable energy store is charged to a predetermined level, and driving the motor/generator with electric energy from both the generator and the rechargeable energy store at the same time.

These and other objects, features and advantages of the present invention will become more apparent upon reading the following specification in conjunction with the accompanying drawing figures.

BRIEF DESCRIPTION OF THE DRAWINGS

The accompanying figures, which are incorporated in and constitute a part of this specification, illustrate several aspects described below.

DETAILED DESCRIPTION OF THE INVENTION

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

Examples of the present disclosure can comprise puller-tensioners for stringing wires, pulling lines, ropes, cables, and the like (collectively, "pulling lines"). The system can comprise an engine coupled to a generator, which drives a motor and can charge a battery bank, a capacitor bank, or both ("energy bank" or "battery/capacitor bank"). The energy bank, likewise, can provide power to the motor as needed.

During tensioning, the motor provides resistance to the rotation of a drive line (cable drum) to provide tension to the line for proper stringing conditions. When providing resistance, the motor can return energy to be stored in the energy bank. When the power generated, or the rate of power generated, is greater than can be absorbed by the energy bank, a resistor bank can be used to dissipate excess power.

In some cases, the engine can be a combustion engine that may provide additional resistance to counteract any excess pull. During pulling, on the other hand, the motor (powered by the energy bank, as needed) turns a drum that pulls the line for installation. In some cases, however, more power is needed for installation than can be provided by the generator or energy bank alone. In this case, the generator may be used to pre-charge the energy bank to enable both the generator and the energy bank to be used in unison to provide additional power to the motor than can be provided by either source alone.

In other situations, the combustion engine can be directly mechanically communicative to the drive line, assisting the motor or altogether bypassing the need for the motor in specific situations.

Examples of the present disclosure may include additional energy sources and stores. For example, the system can be adapted to receive power from an external power source (e.g., by plugging into an external generator or the power grid). The external power can directly power the motor, charge the battery/capacitor bank and other systems.

In an embodiment, the puller-tensioners may include a kinetic energy store (e.g., a flywheel). The kinetic energy store may be driven during tensioning if the battery and/or capacitor bank are unable to absorb all of the energy produced. When the energy to be absorbed is reduced, the puller-tensioners may then utilize the kinetic energy store to charge the energy bank.

For ease of explanation, the system is discussed below with reference to stringing and supporting power and communications lines. One of skill in the art will recognize, however, that the system is not so limited. Indeed, the system could be used in any number of industries where ropes, support cables (e.g., for ski lifts), communications cables, wires, and other similar products need to be efficiently installed and supported. Thus, the description below is intended to be illustrative and not limiting.

Figure 1:
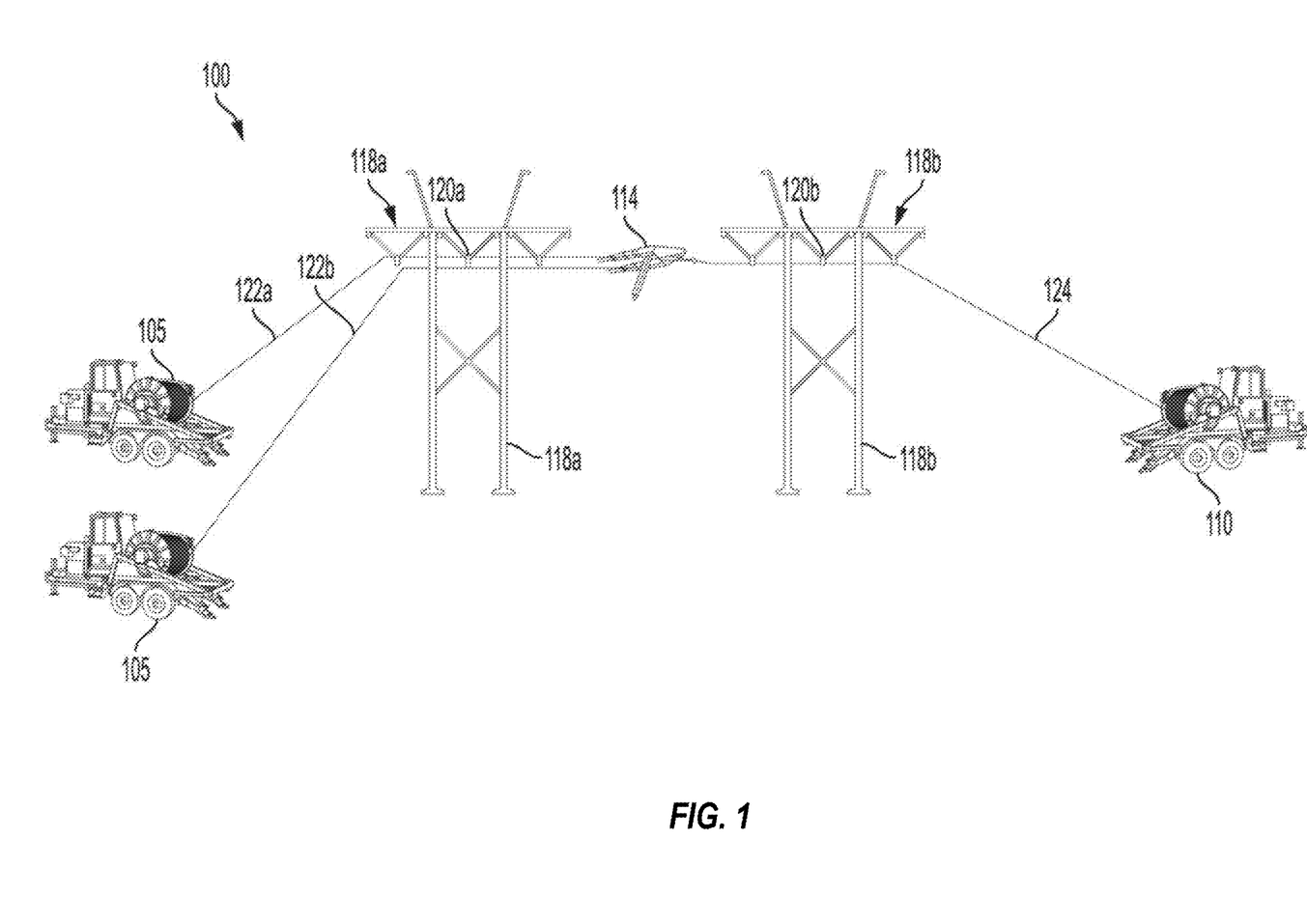
FIG. 1 depicts conductor installation with a pair of puller-tensioners.

FIG. 1 illustrates an example of conductor installation 100. Two puller-tensioners 105 and one puller-tensioner 110 are situated at opposite ends of a span for installation. In some embodiments, the system 100 includes two tensioners 105, a running board 114, puller 110, power transmission towers/poles 118a, 118b, one or more blocks 120a, 120b associated with each power transmission pole, conductors 122a, 122b and a pulling line 124.

The puller 110 pulls a pulling line 124 connected to the conductors 122a, 122b through the running board 114. Meanwhile, tensioners 105 provides tension on the conductors 122a, 122b to limit improper sagging of the conductors 122a, 122b as they are pulled across poles 118a, 118b.

In some applications, the power transmission towers/poles 118a, 118b extend over a distance of multiple miles (e.g., 4-5 miles). Prior to the installation, pulling line 124 is extended and strung through the blocks (e.g., 120a, 120b) associated with each of the power transmission towers/poles 118a, 118b.

The running board 114 is connected on one side to the pulling line 124 at a location near to tensioner 105. The conductors 122a, 122b to be installed are connected to the other side of the running board 114. At this point in the conductor pull operation, the running board is pulled through the blocks 120a, 120b associated with each of the power transmission towers/poles 118a, 118b, thereby installing the conductors into place along the blocks and spanning the distance between the puller 110 and the tensioners 105.

More particularly, the puller 110 includes a motor that provides a pulling force to pulling line 124. The tensioners 105 apply an opposite force (e.g., a tensioning force) that opposes the pulling force applied to pulling line 124 to maintain tension in the conductors 122a, 122b while allowing the conductors to be pulled through the blocks towards the puller 110. In some embodiments, the tensioners 105 apply tension separately to each conductor 122a, 122b being pulled.

Figure 2:
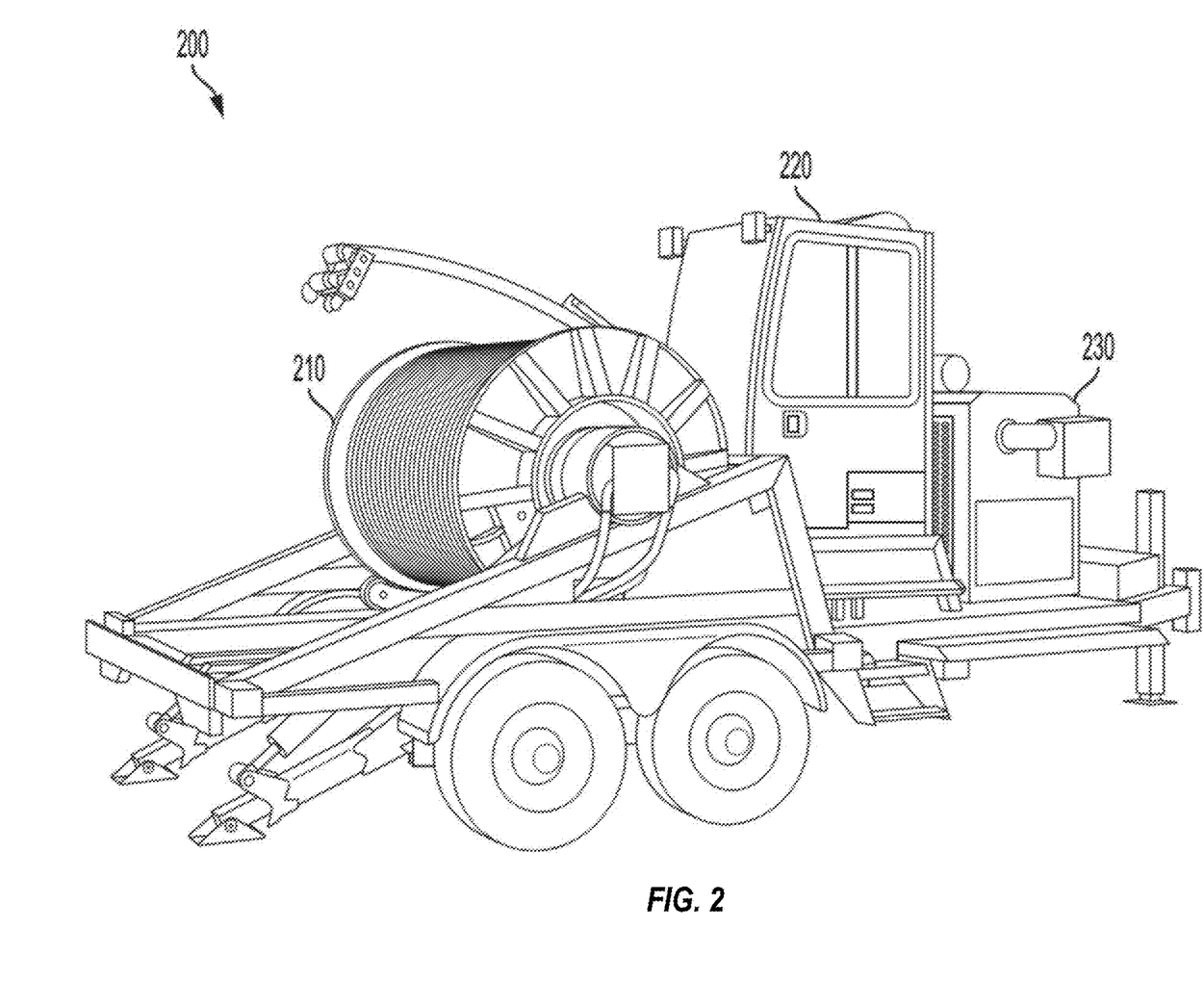
FIG. 2 is a side view of an example puller-tensioner.

FIG. 2 illustrates an exemplary puller-tensioner 200. Puller-tensioner 200 includes a drive line 210 (a drum, bull wheel, drive line or the like), a console 220, and a power assembly 230. Drive line 210 may be turned during conductor installation, either by unraveling a conductor 122a wrapped around it (when used for tensioning) or to wrap a pulling line 124 and/or pulling a conductor 122a (when used for pulling).

Console 220 may include controls for the puller-tensioner. The controls may operate the motor, selectively control tensioning or pulling, and/or select from the various power sources. In some cases, the controls may instruct the generator to charge the battery or another energy store in order to provide greater power to the motor (e.g., so that the generator and battery may provide power to the motor in unison). Power assembly 230 provides power to drum 210.

Figure 3:
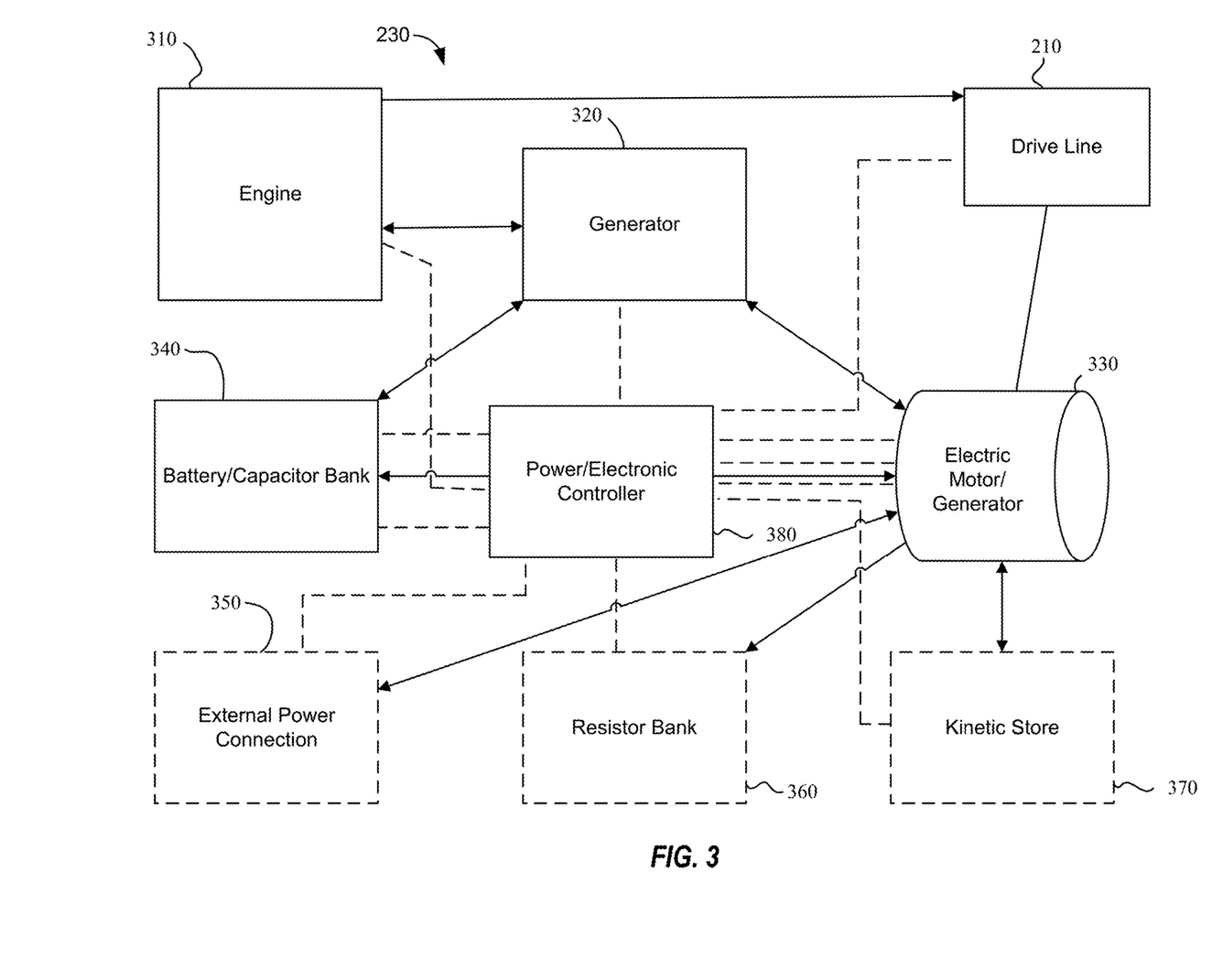
FIG. 3 is a block diagram of an example power assembly and control system.

FIG. 3 is a block diagram of various components of power assembly 230 and control system 380. The power assembly 230 can comprise a first source of electric power 340 and a second source of electric power 320 different than the first source, each of the first source 340 and the second source 320 configured to provide, on its own, sufficient power to operate a motor/generator 330 for a drive line 210 associated with a stringing operation of one or more conductors, wherein the stringing operation comprises driving the drive line 210 in a pulling mode and resisting the drive line 210 in a tensioning mode.

Power assembly 230 includes an engine 310, a generator 320, a motor/generator 330, and a battery and/or capacitor bank ("energy bank 340"). Motor/generator 330 operates drum 210, either by controlling drum 210 to turn (e.g., during a pulling operation), or by resisting the turning of drum 210 (i.e., in a tensioning operation). Motor/generator 330 may receive power from generator 320 and/or energy bank 340. Generator 320 generates electric power from engine 310 and provides the power to energy bank 340 and/or motor/generator 330.

During a pulling operation, engine 310 may be run to generator 320. The power from generator 320 may be provided to motor/generator 330 to rotate drum 210. In some cases, generator 320 may provide more power than is needed by motor/generator 330. In this case, excess power from generator 320 may be provided to energy bank 340 to charge energy bank 340. In some cases, generator 320 may provide insufficient energy to power motor/generator 330. In such cases, energy bank 340 may be used to provide power to motor/generator 330. In some instances, generator 320 may first charge energy bank 340 and then, together with energy bank 340, provide increased power to motor/generator 330. In this manner, more power than can be provided from either source alone (i.e., generator 320 or battery bank 340) may be used to install the conductor. Of course, based on demand, power can also be provided only from energy bank 340 or the generator 320.

In some implementations, motor/generator 330 may receive power from an external power connection 350. For example, motor/generator may have a 240V connector and be configured to connect with an external power source (e.g., an external generator or the power grid). In this case, power may be provided to motor/generator 330 from any combination of generator 320, energy bank 340, and external power connection 350.

During a tensioning operation, motor/generator 330 provides resistance to the turning of drum 210 to provide tension to the conductor line. The energy generated by motor/generator 330 during tensioning can be used to charge energy bank 340. When energy bank 340 cannot store all of the energy produced (i.e., because it is fully charged or because the rate of energy production exceeds the charging rate of energy bank 340), generator 320 and/or engine 310 may be used to absorb some of the energy. The generator 320 can be used to turn over the engine 310, for example, to use the compression of the engine 310 to dissipate excess energy. Additionally, excess energy may be provided to external power connection 350 to enable the grid to absorb the energy and/or to dissipate energy within the external generator. In some implementations, a resistor bank 360 may also be provided for excess energy dissipation.

Excess heat produced by the resistor bank 360 may be dissipated with a heat sink and/or fan, or used to heat other components of the power assembly 230. Excess/waste heat can also be used to heat and/or cool on-board systems, like area(s) in proximity to the operator. This heat can be used to provide air-conditioning when needed, and heating when needed, to provide operator comfort.

In some implementations, power assembly 230 may further include a kinetic energy store 370, such as a flywheel. In this configuration, the excess energy generated during tensioning may be used to charge the kinetic energy store 370. The kinetic energy store 370 may later be used to turn the generator 320, for example, to charge the energy bank 340. In some cases, a connection with kinetic energy store 370 may be bi-directional to enable excess energy to "charge" the kinetic energy store 370 (e.g., spin the flywheel), for example, and then use the stored kinetic energy in the flywheel to recharge the energy bank 340.

Control system 380 may be used to selectively control one or more of any components of the present invention. The various components can be communicative with the control system 380 via a number of ways, including wirelessly and wired. The components themselves can have autonomous control, outside of a "central" control system 380, for example, to monitor component features unique to that component, or in order to take actions in view of local control command.

For example, control system 380 may be used to selectively control the energy sources (e.g., engine 310, generator 320, energy bank 340, external power connection 350, and kinetic energy store 370) based on power consumption and/or storage rate. For example, the control system 380 may adjust a throttle for engine 310 and/or draw energy from energy bank 340 based on the current demand of motor/generator 330. Similarly, the control system 380 may control a flow of energy from motor/generator 330 to the various sinks (e.g., engine 310, generator 320, energy bank 340, external power connection 350, resistor bank 360, and kinetic energy store 370) based on the state of the various components of power assembly 230 (e.g., based on a state charge of the energy bank 340, the temperature of the resistor bank 360, etc.). By combining hybrid power generation and dissipation systems, examples of the present disclosure provide increased power, greater adaptability, and enable the use of smaller engines, smaller generators, and smaller energy banks to achieve the same energy inputs and outputs.

Control system 380 can integrate the operation of the drive line of a puller during a stringing operation, comprising driving the drive line in a pulling mode of the stringing operation during a pulling period, and selectively driving the drive line in the pulling mode among at least a parallel configuration, a series configuration, and/or a series-parallel configuration.

In the parallel configuration, a motor located on the puller-tensioner and an engine located on the puller-tensioner can both individually drive the drive line or both can jointly drive the drive line, the motor having a first source of power comprising a battery/capacitor bank In the series configuration, the motor individually drives the drive line, the motor having the first source of power and a second source of power, the first source of power comprising the battery/capacitor bank and the second source of power comprising a generator powered by the engine.

In the series-parallel configuration, the motor and engine can both individually drive the drive line or both can jointly drive the drive line, and the motor has the first source of power and the second source of power, the first source of power comprising the battery/capacitor bank and the second source of power comprising the generator powered by the engine.

Control system 380 can integrate the operation of the drive line of a puller-tensioner during a stringing operation comprising driving the drive line in a pulling mode of the stringing operation during a pulling period, resisting the drive line in a tensioning mode of the stringing operation during a tensioning period, and selectively driving the drive line in the pulling mode among at least a parallel configuration, a series configuration, and/or a series-parallel configuration.

In the parallel configuration, a motor located on the puller-tensioner and an engine located on the puller-tensioner can both individually drive the drive line or both can jointly drive the drive line, the motor having a first source of power comprising a battery/capacitor bank.

In the series configuration, the motor individually drives the drive line, the motor having the first source of power and a second source of power, the first source of power comprising the battery/capacitor bank and the second source of power comprising a generator powered by the engine.

In the series-parallel configuration, the motor and engine can both individually drive the drive line or both can jointly drive the drive line, and the motor has the first source of power and the second source of power, the first source of power comprising the battery/capacitor bank and the second source of power comprising the generator powered by the engine.

Control system 380 can integrate the operation of the drive line of a puller-tensioner during a stringing operation comprising driving the drive line in a pulling mode of the stringing operation by a motor during a pulling period, wherein the motor is powered by a first source of power, resisting the drive line in a tensioning mode of the stringing operation by the motor during a tensioning period, and intelligently controlling the driving and resisting.

The first source of power comprises a battery/capacitor bank, and at least a portion of energy produced during the resisting is stored in the battery/capacitor bank.

Intelligently controlling can comprises determining an amount of the stringing operation completed, determining an amount of the stringing operation left to be completed, monitoring a current capacity of the first power source, determining if the current capacity of the first power source and the added capacity from one or more tensioning periods in the amount of the stringing operation left to be completed is sufficient to power the motor during one or more pulling periods in the amount of the stringing operation left to be completed, changing one or more driving characteristics and resisting characteristics to extend the use of the first source of power to complete as much of the stringing operation before battery/capacitor bank exhaustion.

Intelligently controlling can further comprise providing sufficient power to the drive line from a second source of power different than the first if the battery/capacitor bank will exhaust prior to completion of the stringing operation, and completing the stringing operation with the second source of power and/or augmenting the use of the battery/capacitor bank with the second source of power to complete the stringing operation.

Intelligently controlling can further comprise providing sufficient additional power to the battery/capacitor bank so the battery/capacitor bank will not exhaust prior to completion of the stringing operation.

The present invention can further provide an operator with information related to the control a drive line of a puller-tensioner during a stringing operation. The driving and resisting of the drive line are monitored to determine if the capacity of the battery/capacitor bank can complete the stringing operation.

The operator is then provided with data sufficient to manage the driving and resisting, and the provision of any additional power needs to complete the stringing operation.

The data can be displayed for the operator.

The present invention can further comprise alerting the operator if the capacity of the battery/capacitor bank cannot complete the stringing operation.

The present invention can incorporate the use of natural language control and/or alerts as the equipment is much less noisy without the engine running. Various components of the present invention can be partially or completely controlled and/or monitored by voice, and alerts can be provided by a speaking voice or other audible means.

Figure 4:
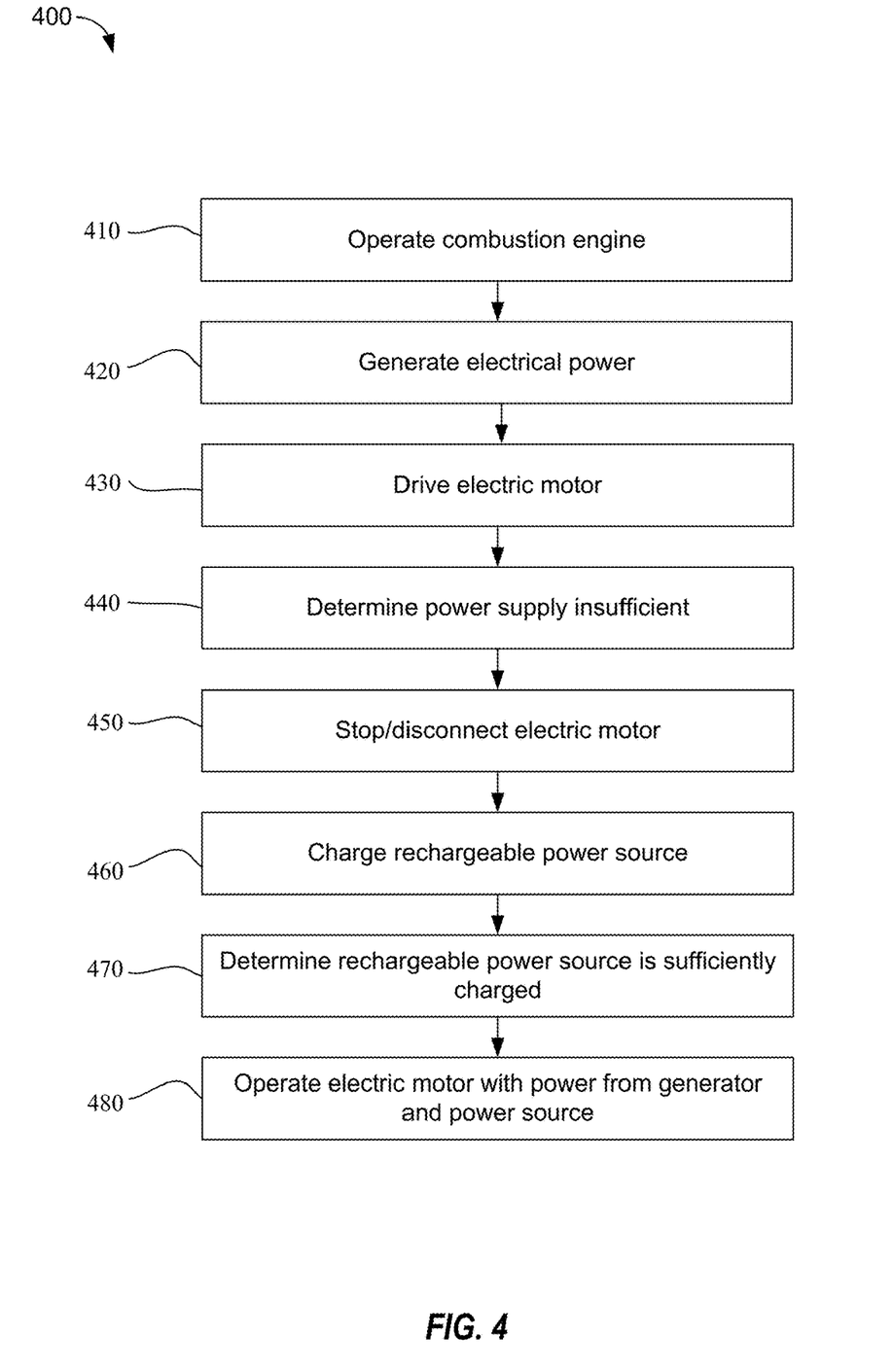
FIG. 4 is a flowchart of an example conductor installation method.

FIG. 4 is a flowchart of an example method 400 of operation of the hybrid puller and/or hybrid tensioner, each 200. The method 400 may be controlled by the control system 380 of the hybrid puller and/or hybrid tensioner, each 200. At 410, the engine 310 is started. At 420, the operation of the engine 310 causes the generator 320 to generate power. At 430, the power from the generator 320 is used to drive the motor/generator 330 (i.e., to rotate the drum 210).

At 440, the control system 380 can determine that the power from the generator 320 is no longer sufficient to meet the needs of the motor/generator 330. As the cable is leaving and running through structures, the weight of the line means more tension. As the length of conductor 118 being pulled increases, for example, the tension required to maintain proper sag increases incrementally by the increased weight on installation sheaves may increase, potentially exceeding the output capacity of the generator 320. Accordingly, at 450, the motor/generator 330 can be stopped (i.e., the power to the motor/generator 330 can be interrupted) and the pulling/tensioning operation can be stopped. At 460, power from the generator 320 can be diverted from the motor/generator 330 to charge the energy bank 340).

At 470, the control system 380 can determine that the energy bank 340 is charged to a predetermined level. This may be based on a set charge level (e.g., 70%, 80%, 100%, etc.), the excess capacity required, or the calculated time required to finish the job, among other things. At 480, when sufficiently charged, power may be provided to the motor/generator 330 from both the generator 320 and the energy bank 340. Accordingly, the combined power available to the motor/generator 330 is greater than can be provided from either the generator 320 or the energy bank 340 alone.

Figure 5:
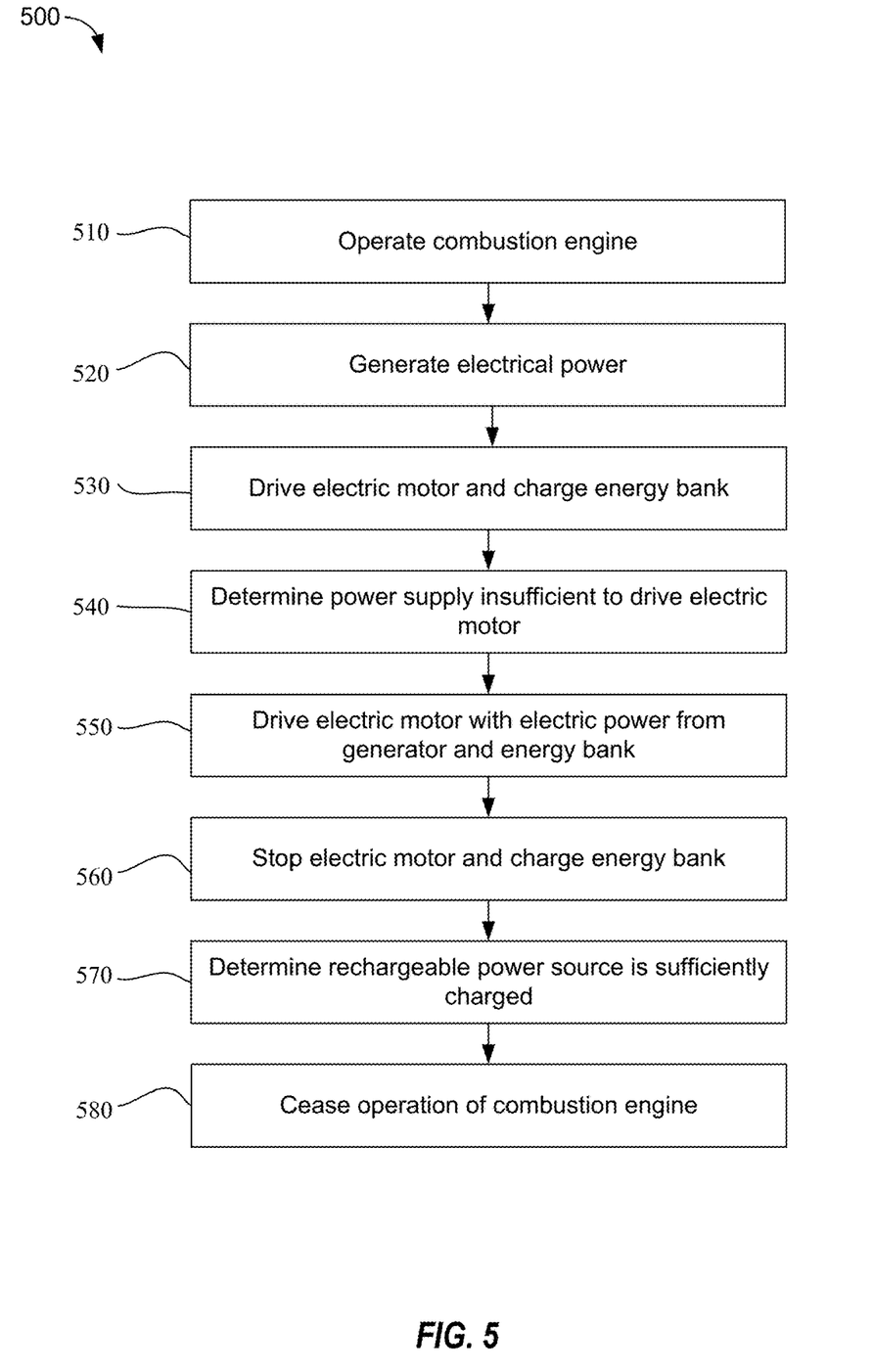
FIG. 5 is a flowchart of an example conductor installation method.

FIG. 5 is a flowchart of an example method 500 of operation of the hybrid puller and/or hybrid tensioner, each 200. The method 500 may be controlled by the control system 380 of the hybrid puller and/or hybrid tensioner, each 200. At 510, the engine 310 is started. At 520, the operation of the engine 310 causes the generator 320 to generate power. At 530, the power from the generator 320 is used to drive the motor/generator 330 (i.e., to rotate the drum 210) and charge the energy bank 340 (e.g., charge a rechargeable energy store).

At 540, the control system 380 can determine that the power from the generator 320 is no longer sufficient to meet the needs of the motor/generator 330. As the length of conductor 122*a*/122*b* being pulled increases, for example, the friction caused by the increased weight on installation sheaves may increase, potentially exceeding the output capacity of the generator 320. Accordingly, at 550, the motor/generator 330 can be driven by power from both the generator 320 and power stored in the energy bank 340. Accordingly, the combined power available to the motor/generator 330 is greater than can be provided from either the generator 320 or the energy bank 340 alone.

At 560, the battery/capacitor bank may be stopped (e.g., after pulling the cabling elements/conductors 122*a*/122*b* is complete) and power from the generator 320 continue to be used to charge the energy bank 340. At 570, the control system 380 can determine that the energy bank 340 is charged to a predetermined level. This may be based on a set charge level (e.g., 70%, 80%, 100%, etc.) and/or a capacity of the energy bank 340. At 580, when sufficiently charged, the engine 310 may be stopped.

The present invention can further comprise telemetry elements, and can provide fine driving/tension control, virtually on-demand/instantly, with electric control over conventional hydraulic systems.

While several possible examples are disclosed above, examples of the present disclosure are not so limited. For instance, while the system is discussed above with reference to suspending power or communications lines, the system could also be used in many other industries such as transportation (e.g., towing, cables cars, street cars, and trains); rope for climbing, rigging, and boundaries; and virtually any other time lines need to be strung and/or suspended. In addition, while various features are disclosed, other designs could be used.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A stringing apparatus comprising:
   an engine;
   a generator to convert power from the engine into electric power;
   a rechargeable power source;
   a drive line; and
   a motor/generator, coupled to the drive line, and in electrical communication with the generator and the rechargeable power source, the motor/generator driving the drive line in a pulling mode.

2. The stringing apparatus of claim 1, wherein the engine is coupled to the drive line;
   wherein the rechargeable power source is in electrical communication with the generator;
   wherein the drive line is configured to receive a cable; and
   wherein the motor/generator is configured to drive the drive line in the pulling mode to pull the cable.

3. The stringing apparatus of claim 2, wherein, in the pulling mode, the motor/generator is configured to receive electric power from:
   only the rechargeable power source; or
   the rechargeable power source and from the generator.

4. The stringing apparatus of claim 2, wherein the rechargeable power source is configured to receive electric power from only the motor/generator, from only the generator, or from both the motor/generator and the generator.

5. The stringing apparatus of claim 2, wherein the motor/generator is further configured to resist the driving of the drive line in a tensioning mode; and
   wherein, in the tensioning mode, the rechargeable power source is configured to receive electric power from the motor/generator.

6. The stringing apparatus of claim 5, wherein, in the pulling mode, the motor/generator is configured to receive electric power from only the rechargeable power source.

7. The puller tensioner stringing apparatus of claim 5 further comprising a kinetic energy store to convert electrical energy from the motor/generator to mechanical energy during a tensioning operation.

8. The stringing apparatus of claim 5 further comprising an external power connection to provide electric power to the motor/generator.

9. The stringing apparatus of claim 5 further comprising a resistor bank to dissipate electric energy received from the motor/generator during a tensioning operation.

\* \* \* \* \*